US006249947B1

(12) United States Patent
Lai

(10) Patent No.: US 6,249,947 B1
(45) Date of Patent: Jun. 26, 2001

(54) TAPERED HANDLE REMOVER

(76) Inventor: Chin-Yi Lai, No. 61, Chung Te 33th Street, Tainan (TW)

( * ) Notice: Subject to any disclaimer, the term of this patent is extended or adjusted under 35 U.S.C. 154(b) by 0 days.

(21) Appl. No.: 09/522,258

(22) Filed: Mar. 9, 2000

(51) Int. Cl.[7] .................................................. B23D 19/04

(52) U.S. Cl. .............................. 29/253; 29/254; 254/104; 81/52.35

(58) Field of Search .............................. 29/253, 239, 254; 144/193 R, 114 R; 254/104; 83/870; 156/184; 81/52.35; 173/91; 145/30.5; 72/457

(56) References Cited

U.S. PATENT DOCUMENTS 891,022 * 6/1908 Weaver .............................. 29/254
2,932,998 * 4/1960 Schmidlin .............................. 29/254
3,919,759 * 11/1975 Marleau .............................. 29/254
4,846,287 * 7/1989 Ericsson .............................. 173/13
4,866,801 * 9/1989 Lamar .............................. 7/165

* cited by examiner

*Primary Examiner*—Joseph J. Hail, III
*Assistant Examiner*—Daniel Shanley
(74) *Attorney, Agent, or Firm*—Pro-Techtor International Services

(57) ABSTRACT

A Mohs tapered handle remover enables a user to remove a bit by rotating a knob on a first end of the device to actuate the device. The knob, through a threaded interface, drives a slide rod outward. The slide rod causes a raising block to separate from a slide seat, thereby driving the bit out of the handle. The device enables the user to use rotational force instead of a direct force to remove the bit.

3 Claims, 5 Drawing Sheets

TAPERED HANDLE REMOVER

BACKGROUND OF THE INVENTION

1. Field of the Invention

The present invention relates to a Mohs tapered handle remover, and more particularly, to a handle remover that allows easy removal of a knife tool with time and effort saving and safe operation.

2. Description of the Prior Art

Whereas, in the prior art as shown in FIGS. 1 and 2, a Mohs tapered handle 1 is mainly for mounting a knife tool 2 (such as a bit, taper bit, formed tool, etc. where a bit is taken as an example in the following demonstration). If it is desired to remove the tool 2, a triangular iron 21 is extended into the long slot 11 of the tapered handle bottom, then struck with a hammer to remove the bit 2. This method is not only time and effort wasting, but also can be dangerous.

The main goal of this invention is to provide a Mohs tapered handle remover which can easily remove a knife tool and ensure time saving, effort saving and safe operation, to fully eliminate the defects of the prior art.

SUMMARY OF THE INVENTION

In brief, the present invention enables a user to remove a bit from a MOHS tapered handle by rotating a knob on a first end of the device to actuate the device. The knob, through a threaded interface, drives a slide rod outward. The slide rod causes a raising block to separate from a slide seat, thereby driving the bit out of the handle. The device enables the user to use rotational force instead of a direct force to remove the bit.

DETAILED DESCRIPTION OF THE PREFERRED EMBODIMENT

Figure 1:
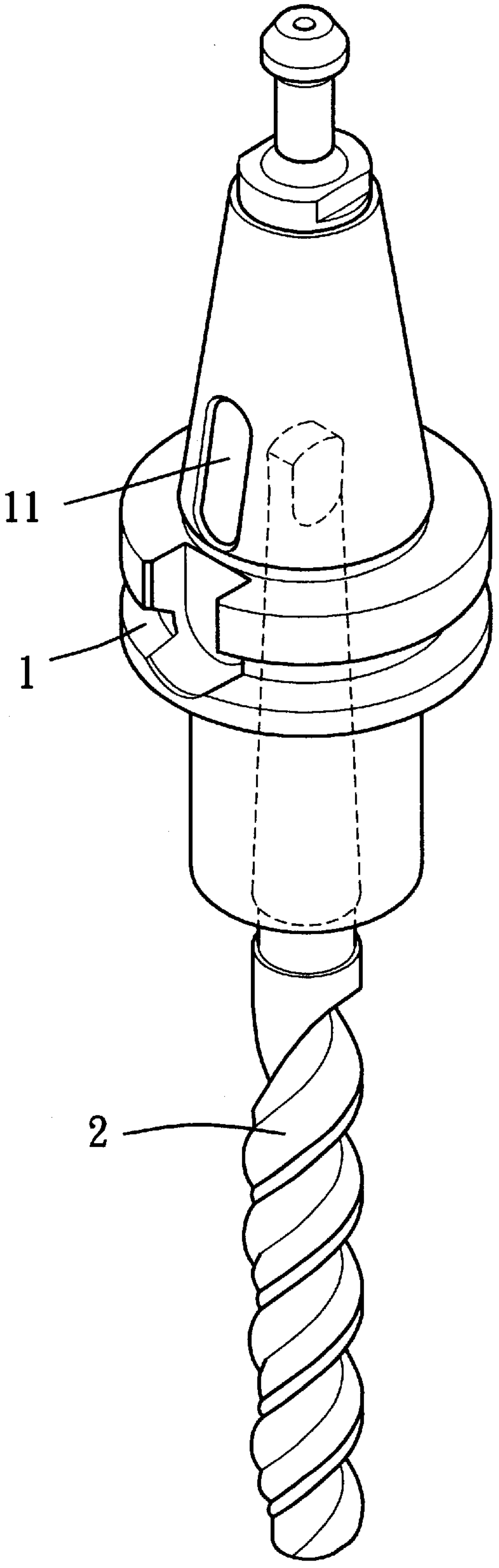
FIG. 1 is a perspective view showing a Mohs tapered handle with a bit.
Figure 2:
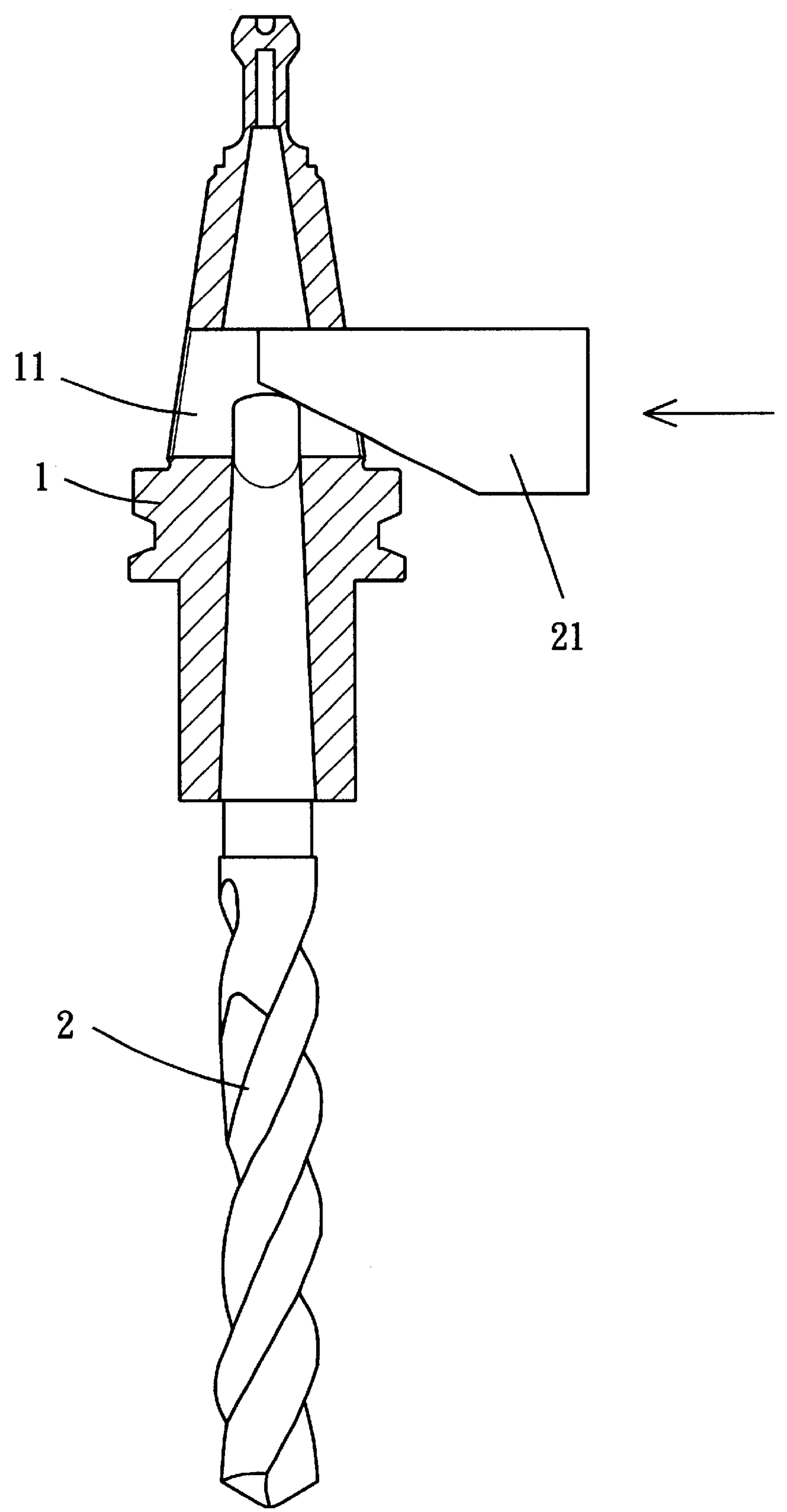
FIG. 2 is a sectional view showing the Mohs tapered handle with a prior art bit remover installed.
Figure 3:
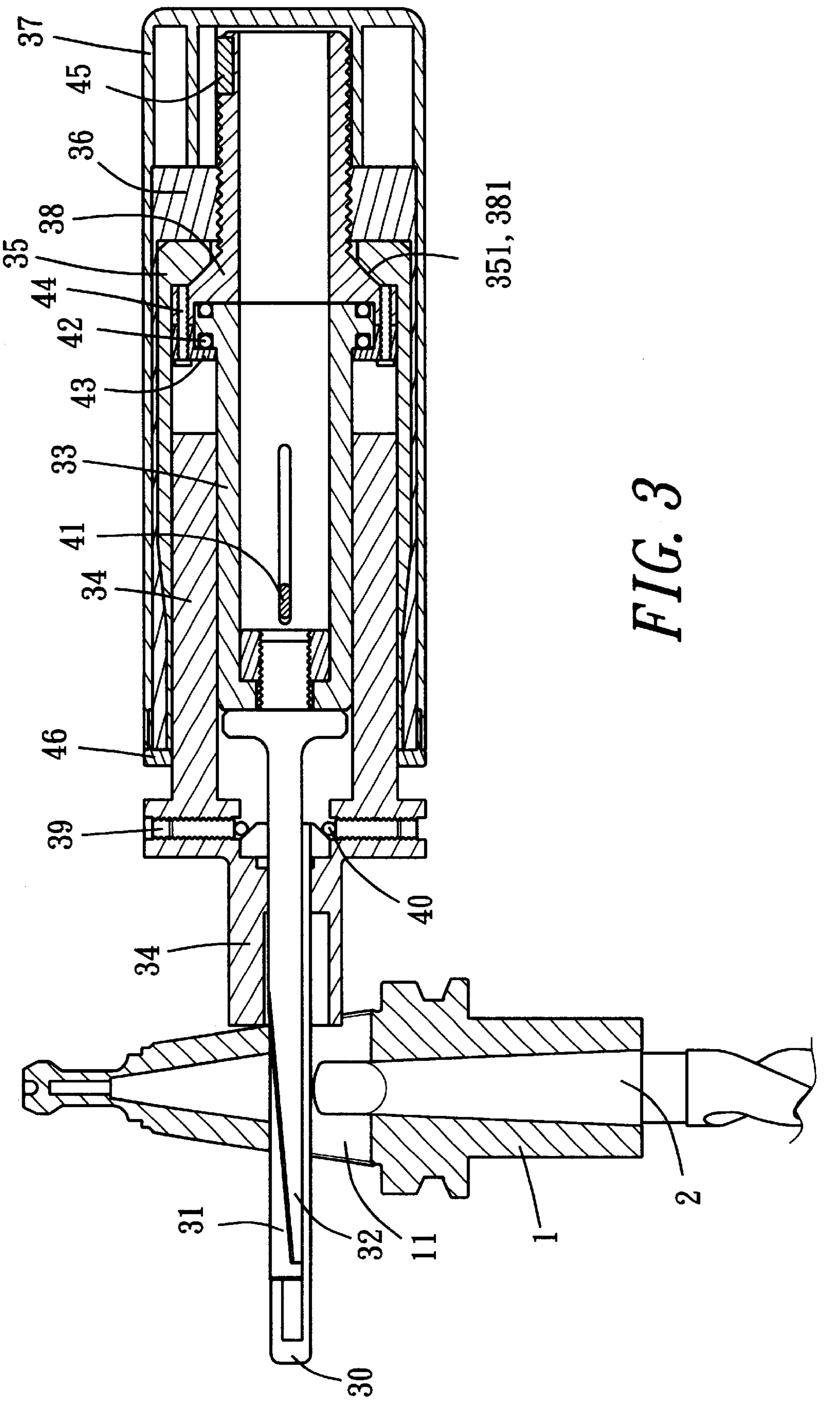
FIG. 3 is a sectional view showing an assembly of the present invention in an at-rest position.
Figure 4:
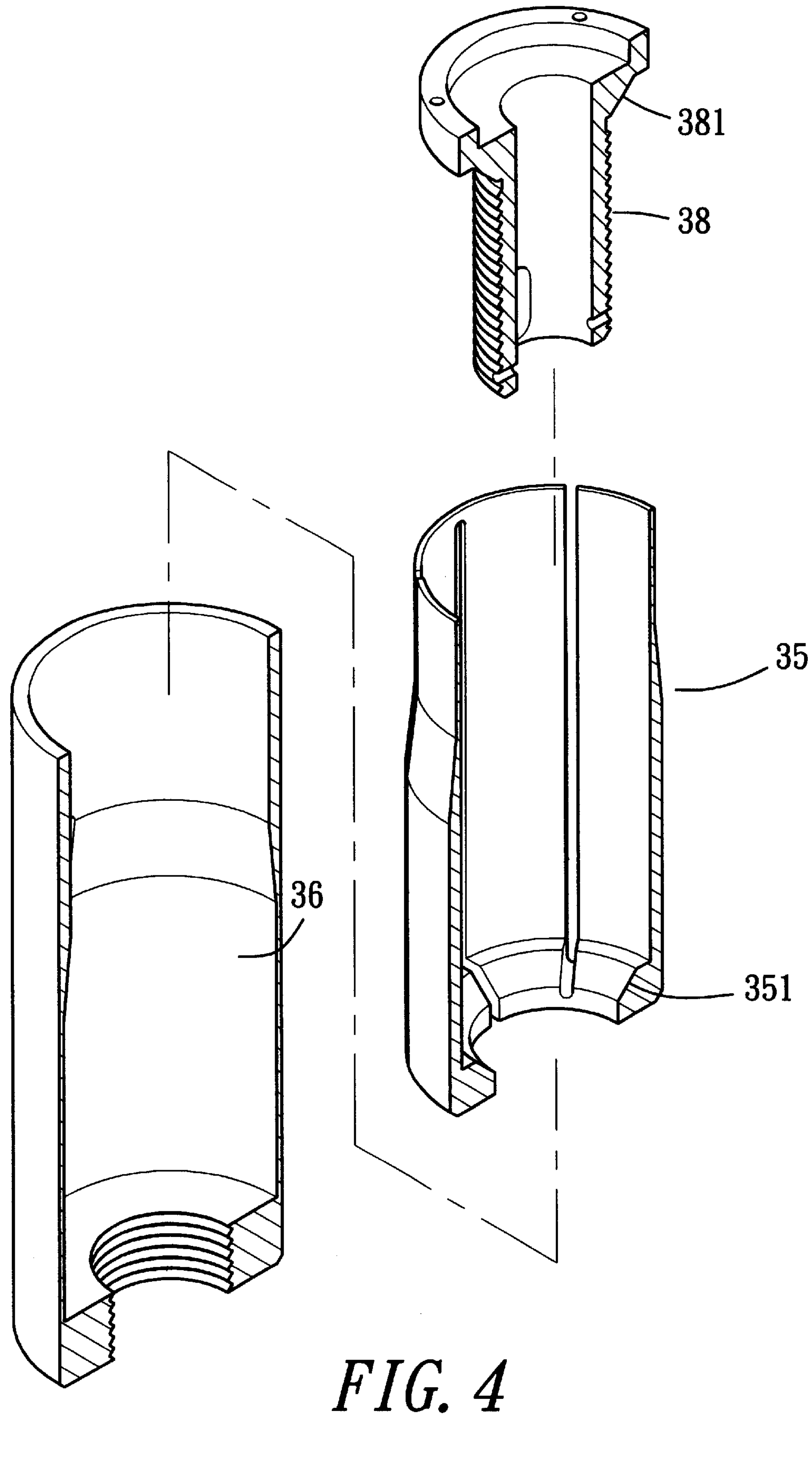
FIG. 4 is an exploded sectional perspective view of the sleeve clamp, mounted sleeve and guide rod of the present invention.

Referring first to FIG. 3, the remover of this invention is comprised of one slide seat 30, devised with a raising block 31 and a slide block 32. The raising block 31 and slide block 32 are joined with a slanted dovetail slot. A slide rod 33 is in threaded coupling with the slide block 32. A slide sleeve 34 serves as a guide for the slide block 32. A sleeve clamp 35 (shown in detail in FIG. 4) encloses an inner end of the slide sleeve 34, and has an internal tapered surface 351. A mounted sleeve 36 encloses the sleeve clamp 35.

A knob 37 is mounted on the outside of the mounted sleeve 36. A guide rod 38 (please refer also to FIG. 4) is situated inside the knob 37. One external tapered surface 381 at a front end of rod 38 rests on the inner tapered surface 351 of the sleeve clamp 35.

The slide block 32 and slide sleeve 34 are positioned by means of screw 39 and bearing 40. Inside the slide rod 33, a brake piece 41 is provided. At the end of the slide block 32, another bearing 42 is provided at the junction with guide rod 38. The connection is formed by means of sleeve ring 43 and screw 41. The mounted sleeve 36 and the guide rod 38 are in threaded communication. The knob 37 and the guide rod 38 are secured together by a flat key 45. A terminal cover 46 is provided at the front end of sleeve clamp 35, mounted sleeve 36 and knob 37, and slide sleeve 34.

The normal standby status of the device of the present invention is as shown in FIG. 3. The sleeve clamp 35, the mounted sleeve 36 and the knob 37 are in at-rest positions, as are the slide rod 33 and the guide rod 38. The raising block 31 is in alignment with the slide seat 30.

Figure 5:
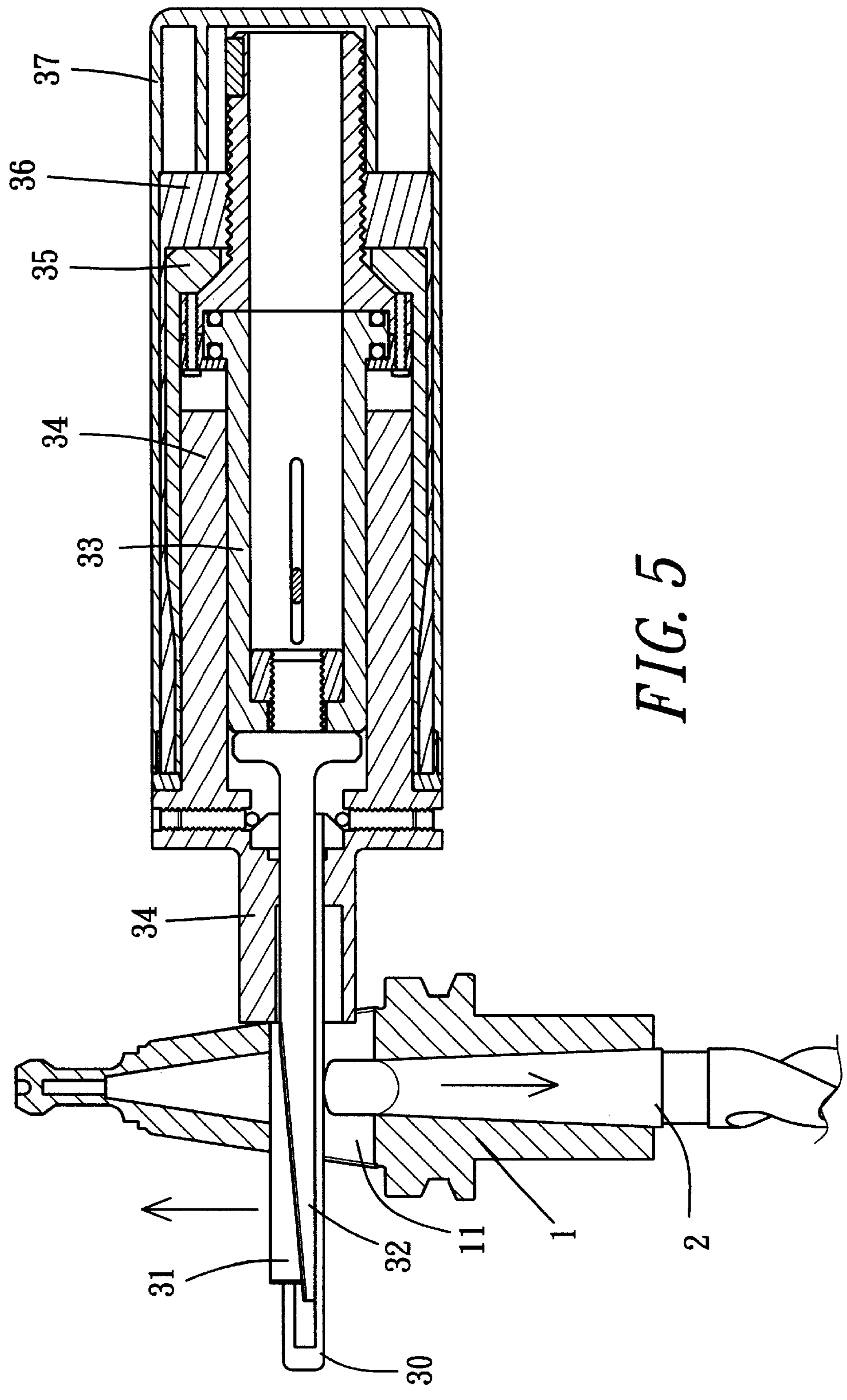
FIG. 5 is a sectional view of the assembly of the present invention in use.

During service, slide seat 30 is first extended into the top end of the long slot 11 of the base area of tapered handle 1. The terminal side of sleeve 34 abuts the external wall of tapered handle 1, as shown in FIG. 3. Force is then applied so as to rotate knob 37, which causes the slide rod 33 to be driven toward the handle 1 via the threaded interface between the guide rod 38 and the mounted sleeve 36. As slide block 32 is moved into the handle 1, raising block 31 is forced upward, thereby driving the bit 2 out of the handle 1, as shown in FIG. 5.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

What is claimed is:

1. A bit removing device to remove a bit from a Mohs tapered handle comprising:

a slide seat including a raising block and a slide block slidably mounted therein, a slide rod coupled to said slide block, a slide sleeve which receives an end of said slide rod and an end of said slide block, a guide rod affixed to said slide rod, said guide rod comprises a threaded end, a rotating knob mounted at an end of said device, said knob being affixed to a mounted sleeve, said mounted sleeve including a threaded portion in communication with said threaded end of said guide rod; wherein when a user places said device in a slot in the Mohs tapered handle and rotates said knob, said mounted sleeve rotates about said threaded end of said guide rod, driving said guide rod away from said knob, said guide rod thereby displaces said slide rod, driving said slide block into the slot in the Mohs tapered handle, a tapered end of said slide block displacing said raising block upward in said slide seat, thereby driving the bit out of the Mohs tapered handle.

2. The bit removing device as claimed in claim 1 wherein:

said slide seat comprises a slanted dovetail slot.

3. The bit removing device as claimed in claim 1 wherein:

said device comprises a sleeve clamp, said sleeve clamp includes a slanted surface which contacts a slanted surface of said mounted sleeve.

* * * * *